Patented Jan. 2, 1951

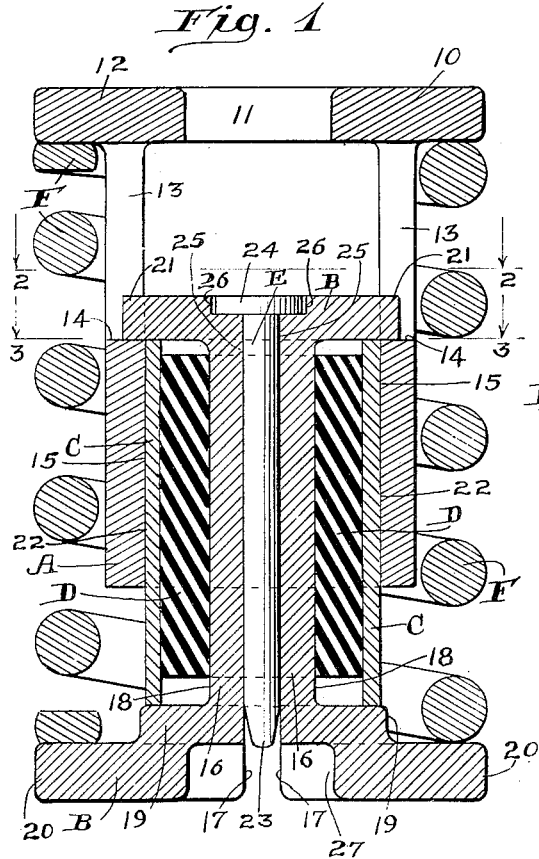
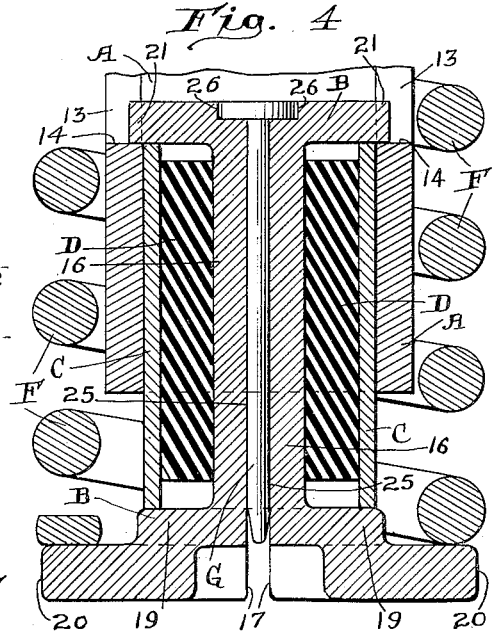
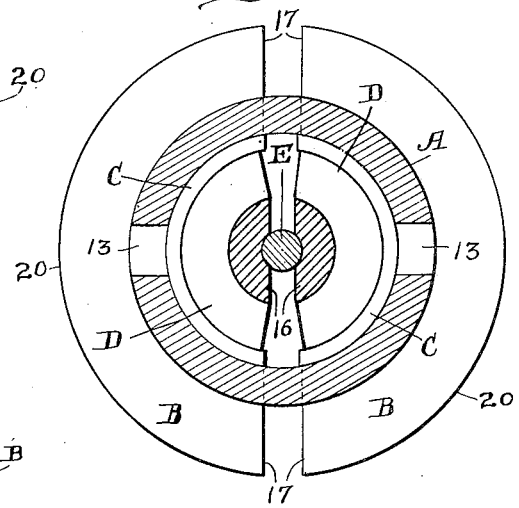
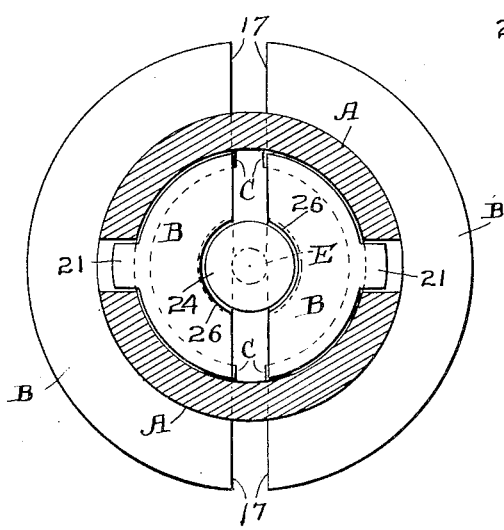

2,536,264

UNITED STATES PATENT OFFICE 2,536,264

FRICTION SHOCK ABSORBER FOR RAILWAY CAR TRUCKS

Vernon S. Danielson, Dolton, Ill., assignor to W. H. Miner, Inc., Chicago, Ill., a corporation of Delaware Application January 14, 1949, Serial No. 70,980

6 Claims. (Cl. 267—9)

This invention relates to improvements in friction shock absorbers especially adapted for use as snubbing devices in connection with truck springs of railway cars.

One object of the invention is to provide a friction shock absorber of the character indicated, comprising a friction casing, a friction element slidingly telescoped within the casing, comprising a central post, friction shoes surrounding the post, and resilient means under compression interposed between the post and shoes for forcing the latter into frictional contact with the interior of the casing, and spring means opposing relative movement of the casing and friction element toward each other, wherein means is provided for adjustably expanding the friction post to vary the pressure exerted on the shoes by the resilient means to control the amount of frictional resistance produced and adjust the shock absorbing capacity of the device.

A more specific object of the invention is to provide a friction shock absorber as set forth in the preceding paragraph, wherein the post is in the form of an expandible member composed of a plurality of sections, and a spreading member engaged between the sections for holding the same expanded, and wherein the shock absorbing capacity of the device may be varied as desired by the use of spreading members of different sizes between the sections of the post.

Other objects of the invention will more clearly appear from the description and claims hereinafter following.

In the drawing forming a part of this specification, Figure 1 is a vertical sectional view of the improved shock absorber. Figure 2 is a horizontal sectional view, corresponding substantially to the line 2—2 of Figure 1. Figure 3 is a horizontal sectional view, corresponding substantially to the line 3—3 of Figure 1. Figure 4 is a broken view, similar to Figure 1, showing a different size of spreading member employed in connection with the sectional post of the device.

My improved shock absorber, as shown in the drawings, comprises broadly a casing A, a sectional post B, a pair of friction shoes C—C, a pair of rubber pads D—D, a spreading member E for the post B, and a coil spring F surrounding the casing and yieldingly resisting movement of the casing toward the post and shoes.

The friction casing A is in the form of a substantially cylindrical, tubular member open at the bottom end and having a tranverse end wall 10 at the top, provided with an opening 11 therethrough, adapted to accommodate the usual spring centering lug of the spring plate of a truck spring cluster of a railway car. The end wall 10 of the casing is extended laterally outwardly of the casing to provide an annular flange forming a spring follower member 12. At diametrically opposite sides, the casing A is vertically slotted, as indicated at 13—13, each slot 13 extending entirely through the wall of the casing. Each slot 13 extends from the top of the casing to a point approximately midway between the upper and lower ends thereof, the bottom end walls of the two slots providing transverse stop shoulders 14—14 for a purpose hereinafter described. The cylindrical side wall of the casing provides an interior friction surface 15, which extends lengthwise of the casing.

The sectional post B is of substantially cylindrical, exterior shape in transverse cross section, comprising a pair of laterally separated, elongated members 16—16, presenting flat, vertically extending, inner surfaces 17—17 and transversely curved, outer surfaces 18—18. Each member 16 of the post has an enlarged base portion 19 at its lower end of substantially, semi-circular, horizontal cross section. The base portion 19 is provided with an outwardly extending, horizontal, semi-circular flange 20, forming a follower member.

At the upper end, each member 16 has a laterally outwardly projecting stop lug 21, which is slidingly engaged in the corresponding slot 13 of the casing and is engageable with the stop shoulder 14. As will be evident, the lugs 21—21 of the two sections of the post B serve to limit relative lengthwise separation of the post and casing by engagement with the stop shoulders 14—14, and also serve to hold the parts assembled.

The friction shoes C—C are arranged at opposite sides of the post B and have sliding engagement with the casing. Each shoe C is in the form of a heavy plate, which is transversely curved to fit the interior of the cylindrical casing A. Each shoe C fits between the base portion 19 and the lug 21 of the corresponding member 16 of the post and has a lengthwise extending, outer friction surface 22, which engages the friction surface 15 of the casing.

The rubber pads D—D are arranged at opposite sides of the post B, each of said pads being interposed between the post and the shoe at the corresponding side of the device.

The spreading member E is in the form of a cylindrical bar, pointed or tapered at its lower end, as indicated at 23, and having a head 24 at its upper end. The spreading member E is interposed between the members 16—16 of the post B to hold the post in expanded condition and place the rubber pads D—D under compression. As shown, the inner sides of the members 16—16 are preferably longitudinally grooved, as indicated at 25, to provide seats which accommodate the opposite side portions of the cylindrical spreading member E, and the upper ends of the members 16—16 are cut out to provide a seat 26 for the head 24 of the spreading member. In this connection it is pointed out that the sectional post B is capable of being expanded to various different diameters by the use of spreading members of different diameters, thus providing for adjustment of the pressure exerted on the shoes C—C through the compressed rubber pads D—D, and thereby controlling the amount of frictional resistance required to produce any desirable shock absorbing capacity. Figure 4 illustrates the shock absorber adjusted in this manner to provide lesser shock absorbing capacity than is had in the structure illustrated in Figure 1, a spreading member G of smaller diameter than the member E being employed, thereby reducing the compression under which the rubber pads D—D are placed.

The spring F surrounds the friction casing A, being interposed between the follower member 12 of the casing and the flanges 20—20 of the two outer members of the post B, and opposes relative movement of the casing and post toward each other. As shown, this spring is in the form of a helical coil, having its top and bottom ends bearing on the follower member 12 of the casing A and the follower flanges 20—20 of the members 16—16 of the post B.

The base portions of the members 16—16 of the post B are preferably recessed, as indicated at 27—27, to accommodate the usual spring centering lug of the bottom spring follower plate of the truck spring cluster of a railway car.

In assembling the mechanism, the rubber pads D—D and the shoes C—C are first placed around the post B, the post being contracted to an extent to permit the lugs 21—21 thereof to pass freely into the casing A. The spring F is then placed in position on the follower flanges 20—20 of the post, and the casing A is telescoped within the spring F and over the assembled unit, comprising the post B, pads D—D, and shoes C—C, with the slots 13—13 of the casing aligned with the lugs 21—21 of the post. The casing A is then forced downwardly against the resistance of the spring F until the stop shoulders 14—14 of the casing reach a position below and clear of the lugs 21—21 of the post B. While held in this compressed condition, the spreader member E is applied by passing the same downwardly through the opening 11 in the end wall 10 of the casing A and forcibly inserting the same between the members 16—16 of the post, thereby spreading the members 16—16 apart to project the lugs 21—21 of the post into the slots 13—13 of the casing and at the same time place the rubber pads D—D under compression.

My improved shock absorber is substituted for one or more of the spring units of a truck spring cluster of a railway car, being interposed between the top and bottom spring plates of the cluster. The shock absorber is thus compressed between the body and truck bolsters in unison with the truck springs of the car.

During compression of my improved shock absorber, the desired frictional resistance is produced by downward sliding movement of the casing A on the friction surfaces of the shoes C—C. Upon recoil of the truck springs, the casing is forced upwardly by the expansive action of the spring F, thus returning the parts to the normal position shown in Figure 1, upward movement of the casing A being positively limited by engagement of the shoulders 14—14 of the casing with the stop lugs 21—21 of the post B.

I claim:

1. In a shock absorber, the combination with a friction casing; of a laterally expandible column member extending into the casing, said casing and column member being movable toward and away from each other; spring means connected to said casing and member opposing relative movement of said casing and member toward each other; friction shoes having sliding frictional engagement with said casing; rubber cushioning means interposed between and engaging said column member and shoes; and a rigid spreading member engaged within said column member for holding said column member expanded and said rubber cushioning means compressed.

2. In a shock absorber, the combination with a tubular casing; of a sectional, laterally expandible post extending into said casing, each section of said post being a rigid element, said post and casing being relatively movable in lengthwise direction with respect to each other; means connected to said post and casing for yieldingly opposing relative movement of the post and casing toward each other; friction shoes slidable within the casing; rubber pad means interposed between and bearing against the shoes and post; and a rigid spreading member interposed and fitting between the sections of said post for holding said sections in expanded position and said rubber pad means compressed against the shoes.

3. In a shock absorber, the combination with a tubular casing; of a sectional, cylindrical post extending into said casing, said post and casing being relatively movable in lengthwise direction with respect to each other, said post comprising a pair of longitudinally extending, outer members and a removable spreading bar engaged between said outer members for holding said post expanded; means connected to said post and casing yieldingly opposing relative movement of the post and casing toward each other; a pair of friction shoes at opposite sides of said post slidable within the casing; and a rubber pad under compression interposed between and bearing on each shoe of said pair and one of the members of said post.

4. In a shock absorber, the combination with a tubular casing; of a sectional post extending into said casing, said casing having stop shoulders thereon, said post and casing being relatively movable in lengthwise direction with respect to each other, said post comprising a plurality of outer members having laterally outwardly extending lugs thereon engageable with the stop shoulders of the casing to limit relative lengthwise separation of the casing and post; a plurality of friction shoes within the casing in lengthwise sliding engagement with the interior wall thereof; rubber pads interposed between the shoes and said outer members of the post; a spreading member between said outer members for holding the post expanded, with the lugs thereof in projected position for engagement with said stop shoulders of the casing; and spring means connected to said post and casing for yieldingly opposing relative movement of said post and casing toward each other.

5. In a shock absorber, the combination with a tubular casing, said casing having a follower flange at its outer end; of a two-part, lengthwise divided, sectional post extending into the casing at the inner end thereof, each of said parts of the post having a follower flange at the outer end thereof; a spring interposed between said follower flanges of the parts of the post and said follower flange of the casing, yieldingly opposing relative movement of the post and casing toward each other; a pair of friction shoes slidable within the casing and held against movement with respect to said post; rubber pads interposed between said post and shoes; and a spreading member between the parts of said post for holding said post expanded and said rubber pads under compression against said shoes.

6. In a shock absorber, the combination with a tubular casing having transverse stop shoulders, and guide slots extending from said shoulders lengthwise of the casing; of a sectional, lengthwise divided friction post having guide lugs projecting outwardly therefrom; a spreader element between the sections of said post for holding the same expanded with the guide lugs engaged in said guide slots in cooperative relation with the stop shoulders of the casing; friction shoes within said casing held against lengthwise movement with respect to said post and slidingly engaged with the interior of the casing; rubber pads under compression between said sectional post and shoes; and spring means bearing on opposite ends on said post and casing for yieldingly opposing relative movement of the post and casing toward each other.

VERNON S. DANIELSON.

REFERENCES CITED

The following references are of record in the file of this patent:

UNITED STATES PATENTS

| Number | Name | Date |
|---|---|---|
| 2,141,680 | Barrows | Dec. 27, 1938 |
| 2,265,392 | Olander | Dec. 9, 1941 |
| 2,381,404 | Cottrell | Aug. 7, 1945 |
| 2,400,504 | Haseltine | May 21, 1946 |